US008886235B2

(12) United States Patent
Engelhart

(10) Patent No.: US 8,886,235 B2
(45) Date of Patent: Nov. 11, 2014

(54) SYSTEMS, METHODS, AND COMPUTER PROGRAM PRODUCTS FOR AUTOMATIC MAPPING BETWEEN PARLAY-X SHORT MESSAGING SERVICE MESSAGE ELEMENT XML ENCODING AND NATIVE SMPP PROTOCOL DATA CODING SCHEME

(71) Applicant: AT&T Mobility II LLC, Atlanta, GA (US)

(72) Inventor: Robert Engelhart, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/770,343

(22) Filed: Feb. 19, 2013

(65) Prior Publication Data
US 2013/0156048 A1    Jun. 20, 2013

Related U.S. Application Data

(63) Continuation of application No. 12/821,765, filed on Jun. 23, 2010, now Pat. No. 8,385,953.

(51) Int. Cl.
*H04W 4/00* (2009.01)
*H04L 29/06* (2006.01)
*H04W 4/18* (2009.01)
*H04L 12/00* (2006.01)
*H04M 3/00* (2006.01)
*H04M 7/12* (2006.01)
*H04W 4/14* (2009.01)

(52) U.S. Cl.
CPC ......... *H04L 29/06068* (2013.01); *H04M 7/123* (2013.01); *H04W 4/18* (2013.01); *H04M 7/1235* (2013.01); *H04L 69/08* (2013.01); *H04L 12/00* (2013.01); *H04W 4/14* (2013.01); *H04M 3/00* (2013.01)
USPC ......................................................... 455/466

(58) Field of Classification Search
CPC ......... H04W 4/14; H04W 4/24; H04W 4/005; H04W 4/16; H04W 4/18; H04W 72/1215; H04W 88/16; H04W 8/10

USPC ............................................... 455/414.4, 466
See application file for complete search history.

(56) References Cited

U.S. PATENT DOCUMENTS 7,752,292 B1 * 7/2010 Katzer .......................... 709/222
8,340,700 B2 * 12/2012 Modin .......................... 455/466

(Continued)

OTHER PUBLICATIONS

3rd Generation Partnership Project: Technical Specification Group Core Network and Terminals; Open Service Access (OSA); Parlay X Web Services, 3GPP TS 29.199-1 V6.5.0 (Mar. 2007).

(Continued)

*Primary Examiner* — Kwasi Karikari
(74) *Attorney, Agent, or Firm* — Hartman & Citrin LLC

(57) ABSTRACT

Systems, methods, and computer program products are for mapping an extensible markup language (XML) encoding declarations to a short message peer-to-peer (SMPP) data coding scheme (DCS) for a mobile-terminated (MT) short messaging service (SMS). An exemplary method includes receiving a message from a short message entity (SME) for delivery to a mobile device. The message includes a payload with at least one character encoded in accordance with a first character encoding scheme. The exemplary method further includes receiving from the SME a second encoding scheme for the message, implementing a mapping table to map the first character encoding scheme to the second character encoding scheme, and performing an encoding transformation of the message from the first character encoding to the second character encoding scheme yielding a modified message comprising the payload of the message encoded in the second character encoding scheme as specified by the SME.

18 Claims, 6 Drawing Sheets

(56) References Cited

U.S. PATENT DOCUMENTS

2003/0018704 A1  1/2003  Polychronidis et al.
2003/0193967 A1  10/2003  Fenton et al.
2004/0120311 A1  6/2004  Marsot et al.
2008/0123686 A1  5/2008  Lee et al.
2011/0070861 A1  3/2011  Daly et al.
2011/0269484 A1  11/2011  Cazanas et al.

OTHER PUBLICATIONS

3rd Generation Partnership Project: Technical Specification Group Core Network and Terminals; Open Service Access (OSA); Parlay X Web Services, 3 GPP TS 29.199-4 V6.7.0 (Mar. 2007).
Short Message Peer to Peer Protocol Specification v3.4, Oct. 12, 1999 Issue 1.2.

* cited by examiner

SYSTEMS, METHODS, AND COMPUTER PROGRAM PRODUCTS FOR AUTOMATIC MAPPING BETWEEN PARLAY-X SHORT MESSAGING SERVICE MESSAGE ELEMENT XML ENCODING AND NATIVE SMPP PROTOCOL DATA CODING SCHEME

CROSS-REFERENCE TO RELATED APPLICATION

This application is a continuation of U.S. patent application Ser. No. 12/821,765, now U.S. Pat. No. 8,385,953, filed Jun. 23, 2010.

TECHNICAL FIELD

The present disclosure relates generally to protocol conversion and, more particularly, to systems, methods, and computer program products for automatic mapping between the Parlay-X short messaging service Extensible Markup Language (XML) encoding format for the message element and native Short Message Peer-to-Peer (SMPP) protocol data coding scheme (DCS).

BACKGROUND

Parlay-X (PX) is a set of open telecom web-service standards defined by the Parlay Group. The Parlay Group is a multi-vendor consortium formed to develop open, technology independent application programming interfaces (APIs) that enable the development of applications operating across multiple, networking-platform environments.

Parlay integrates intelligent network (IN) services with information technology (IT) applications via a secure interface that allows billing of services. By not requiring detailed knowledge of underlying code, networks and environments, Parlay open APIs enable developers to be innovative and to focus on business logic. Parlay-based portable, network-independent applications are connecting IT and telecom, generating new revenue streams for network operators, application service providers (ASPs), and independent software vendors (ISVs). The Parlay Group has released PX web-services specifications for messaging services, such as short messaging and multimedia messaging.

Short messaging typically utilizes the short message peer-to-peer (SMPP) protocol. The SMPP protocol is an open, industry standard protocol designed to simplify interconnection between various entities to exchange short messaging service (SMS) messages.

SUMMARY

According to one aspect of the present disclosure, a method for mapping an extensible markup language (XML) encoding declaration to a short message peer-to-peer (SMPP) data coding scheme (DCS) for the mobile-terminated (MT) short messaging service (SMS) includes receiving a message from a short message entity (SME) for delivery to a mobile device. The message includes a payload at least one character encoded in accordance with a first character encoding scheme. In one embodiment, the payload is the "message" element name within Parlay-X (PX) Short Messaging Service (SMS) API. The method further includes receiving from the SME a second encoding scheme for the message, implementing a mapping table to map the first character encoding scheme to the second character encoding scheme, and performing an encoding transformation of the message from the first character encoding to the second character encoding scheme yielding a modified message comprising the payload of the message encoded in the second character encoding scheme as specified by the SME.

In one embodiment, the method further includes sending the modified message to a short message service center (SMSC) for delivery to the mobile device. In this embodiment, the method may further include generating and sending a notification to the SME. The notification indicates that the modified message was delivered to the mobile device.

In one embodiment, the message is a PX sendSMS message, the first character encoding scheme for the PX SMS message element is an encoding scheme with an appropriate XML encoding declaration, and the second character encoding scheme is a short message peer-to-peer (SMPP) data coding scheme (DCS) for the message.

In one embodiment, the encoding scheme is one of a Unicode Transformation Format 8 (UTF-8), UTF-16, UCS-2, ISO-10646-UCS-2, ISO-10646-UCS-4, ISO-8859-1, ISO-8859-2, ISO-8859-9, ISO-2022-JP, Shift JIS, and EUC-JP.

In one embodiment, the SMPP DCS is Octet unspecified (8-bit binary). Other possible DCS values include MC Specific, IA5 (CCITT T.50)/ASCII (ANSI X3.4), Octet unspecified (8-bit binary), Latin 1 (ISO-8859-1), Octet unspecified (8-bit binary), JIS (X 0208-1990), Cyrillic (ISO-8859-5), Latin/Hebrew (ISO-8859-8), UCS2 (ISO/IEC-10646), Pictogram Encoding, ISO-2022-JP (Music Codes), Kanji JIS (X 0212-1990), KS C 5601, GSM message waiting indicator (MWI) control, GSM message class control, and the like.

In one embodiment, the message includes a multimedia component including at least one of an image, a sound, and a video.

According to another aspect of the present disclosure, bytes are passed transparently, without transformation, to the SMSC with a destination of the destination encoding scheme. For example, suppose UTF-16 is specified as the originating scheme and UCS-2 as the DCS (assuming all the characters are in the Unicode Basic Multilingual Plane (BMP); then the applicable bytes are copied into the value field of the SMPP message-payload parameter. Message decoding and display, in one embodiment, is done by an application on the mobile device that recognizes the incoming coding format based on the DCS or, alternatively, may choose to analyze the bytes to determine the real encoding scheme to use.

According to another aspect of the present disclosure, a non-transitory computer-readable medium includes instructions that, when executed by a processor, cause the processor to perform the aforementioned method.

According to another aspect of the present disclosure, a system includes a network interface, a processor, and a memory including instructions that, when executed by the processor, cause the processor to perform the aforementioned method.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

The systems and methods of the present disclosure may be implemented in wireless networks that use exemplary telecommunications standards, such as Global System for Mobile communications (GSM) and a Universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

Figure 1:
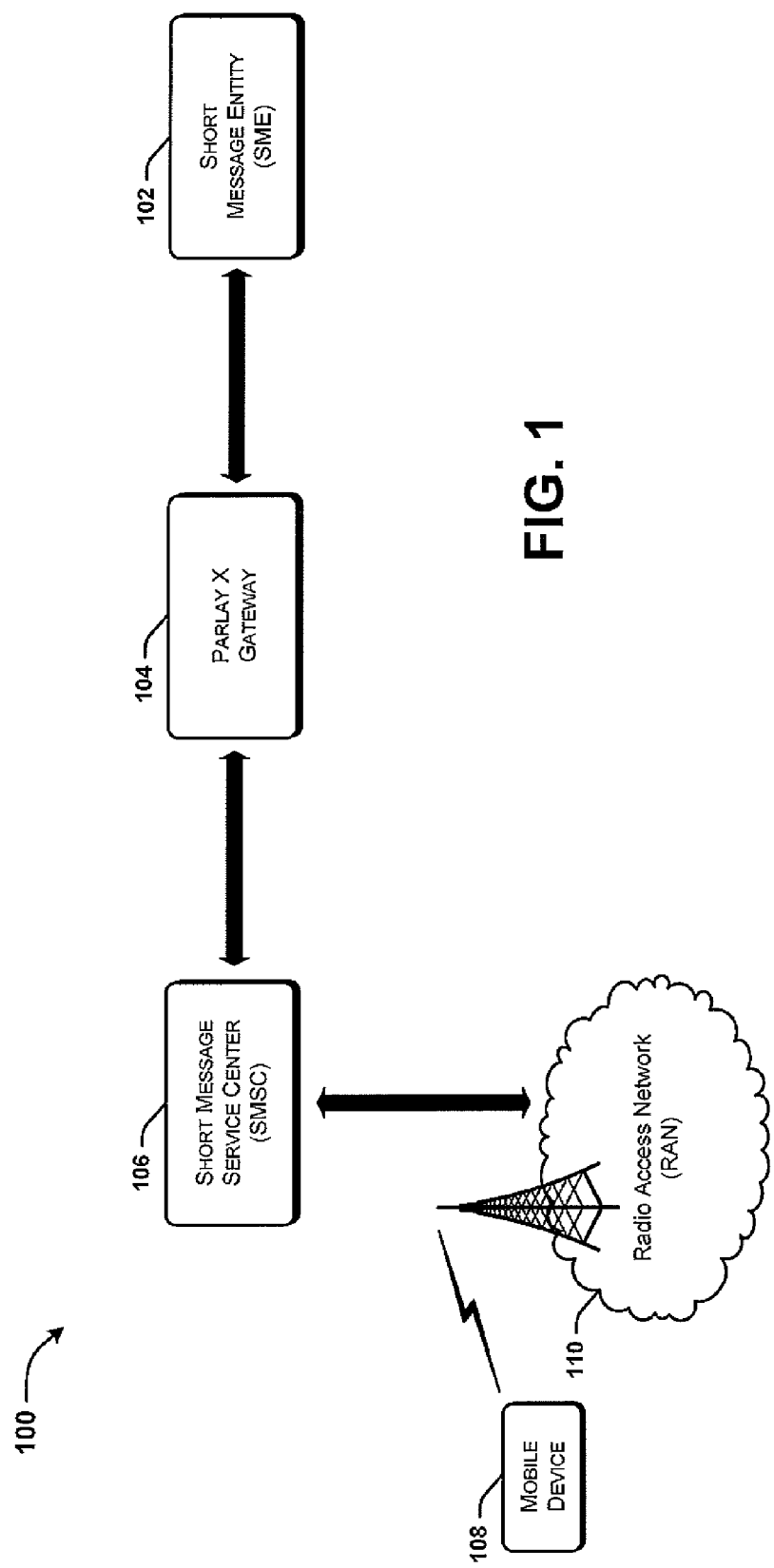
FIG. 1 schematically illustrates a network architecture, according to an exemplary embodiment of the present disclosure.

Referring now to the drawings in which like numerals represent like elements throughout the several views, FIG. 1 schematically illustrates a network architecture 100, according to an exemplary embodiment of the present disclosure. The illustrated network architecture 100 includes a short message entity (SME) 102, a Parlay-X (PX) gateway 104, a short messaging service center (SMSC) 106, a mobile device 108, and a radio access network (RAN) 110.

The SME 102 is an entity which may send or receive short messaging service (SMS) messages. The SME 102 may be located in a mobile network, as illustrated, a fixed network, or the SMSC 106. Although a single SME is illustrated, in some embodiments, multiple SMEs are in communication with the PX gateway 104. These additional SMEs may be configured like the illustrated SME 102. In one embodiment, the SME 102 is a third party application. In one embodiment, the SME 102 is configured to provide short messages including information related to one or more of news, sports, technology, entertainment, politics, health, mobile applications, subscriber accounts, banking, stock market, and the like.

The PX gateway 104 is configured to map extensible markup language (XML) encoding declarations to short message peer-to-peer (SMPP) data coding scheme (DCS) for mobile-terminated (MT) SMS. The PX gateway 104 includes a network interface, a processor in communication with the network interface, and a memory in communication with the processor. In one embodiment, the memory includes instructions that, when executed by the processor, cause the processor to perform various operations, such as those described immediately below.

The PX gateway 104 is configured to receive a message from the SME 102 for delivery to the mobile device 108. The message includes a payload with at least one character encoded in accordance with a first character encoding scheme. The PX gateway 104 is further configured to receive a second encoding scheme for the message from the SME 102. The PX gateway 104 is further configured to implement a mapping table to map the first character encoding scheme to the second character encoding scheme. The PX gateway 104 is configured to perform an encoding transformation of the message from the first character encoding to the second character encoding scheme to yield a modified message including the payload of the message encoded in the second character encoding scheme as specified by the SME 102. Alternatively, depending on the originating encoding scheme and the selected DCS, transformation may not be necessary or wanted. For example, if an encoding scheme of GP 18030 is specified and a DCS of "Reserved" is used, then it may be that the PX gateway 104 copies the message byte-for-byte, allowing an application operating on the mobile device to properly handle the message. The PX gateway 104 and the components thereof are illustrated and described in detail below with reference to FIG. 5.

The SMSC 106 is an entity configured to receive, store, and forward SMS messages to a destination entity, such as the mobile device 108.

The mobile device 108 is configured to communicate with the SMSC 106 via the RAN 110 to send/receive SMS messages. In accordance with aspects of the present disclosure, the mobile device 108 receives SMS messages originating from the SME 102 and/or other SMEs (not illustrated). The mobile device 108 and components thereof are described in detail below with reference to FIG. 6.

The RAN 110 includes at least one radio communications component, such as a base transceiver station (BTS) or Node-b in GSM and UMTS network types, respectively. The BTS/Node-b functions as the terminating node for the radio interface in the illustrated RAN 110. Each BTS/Node-b includes one or more transceivers and is responsible for providing the radio/air interface to the mobile device 108.

Each radio communications component is in communication with a controller component, such as a base station controller (BSC) or radio network controller (RNC) in GSM and UMTS network types, respectively. Typically, a BSC/RNC has tens or even hundreds of BTSs/Node-bs under its control. The BSC/RNC is configured to allocate radio resources to mobile devices (e.g., the mobile device 108), administer frequencies, and control handovers between BTSs/Node-bs, except in the case of an inter-mobile switching center (MSC) handover, in which case control is in part the responsibility of the MSC. One function of the controller component is to act as a concentrator, so that many different low capacity connections to the radio communications component become reduced to a smaller number of connections towards the MSC. Generally, this means that networks are often structured to have many BSCs/RNCs distributed into regions near the BTSs/Node-bs and connected to large centralized MSC sites. In some embodiments, a controller component and a radio communications component are combined.

Although the RAN 110 has been generally described in context of a GSM/UMTS network environment. The RAN 110 may alternatively or additionally include components for operating using other network technologies, such as the exemplary network technologies described herein above.

It should be noted that the illustrated network architecture 100 does not illustrate certain core network components, such as MSCs, GPRS support nodes, location registers, and the like, so as not to obscure the novel aspects of the present disclosure. These and other components are contemplated as being in communication with one or more of the illustrated components in implementation.

Figure 2:
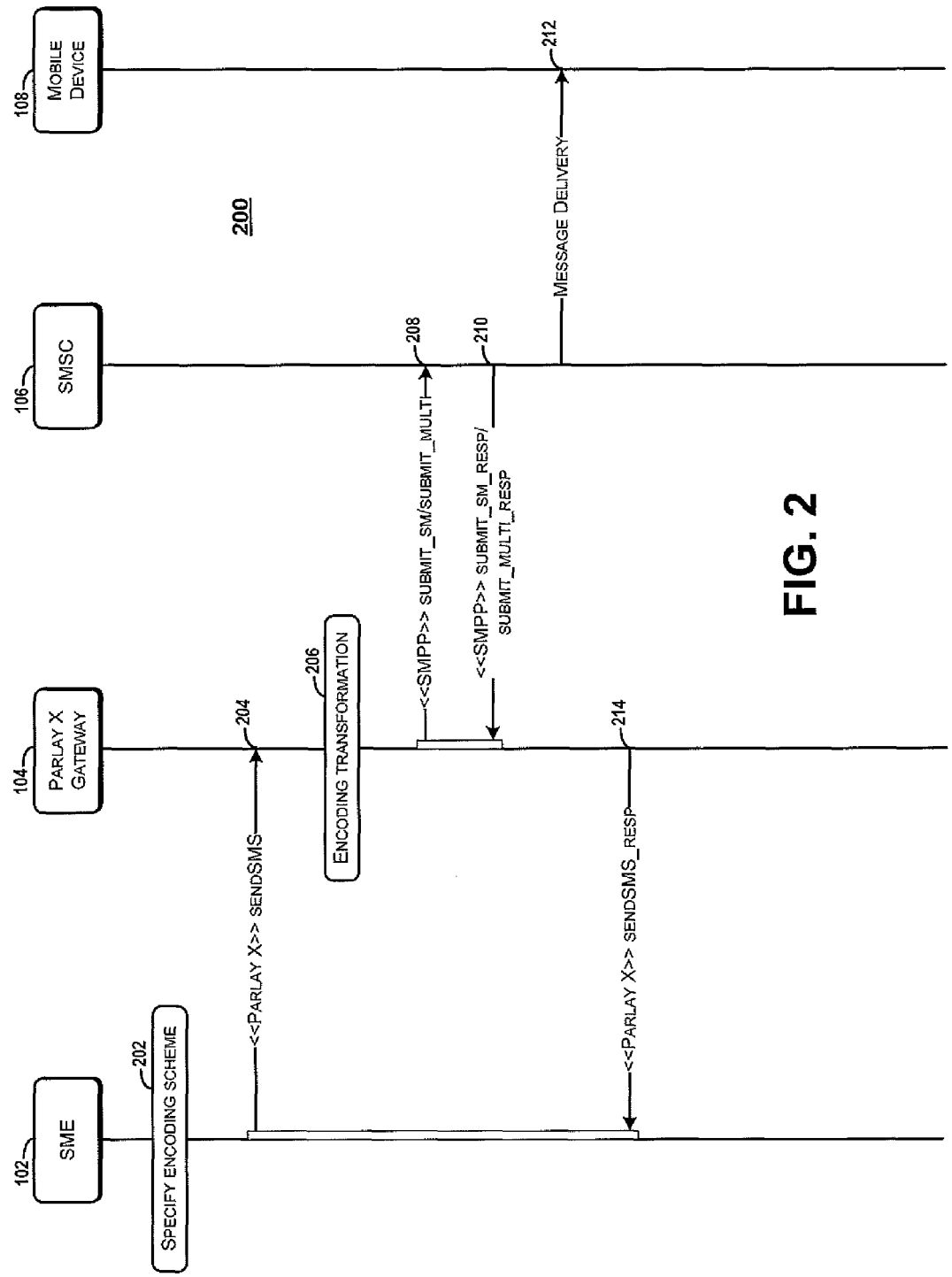
FIG. 2 schematically illustrates a message flow for a mobile-terminated message in accordance with an exemplary embodiment of the present disclosure.

Referring now to FIG. 2, a message flow diagram 200 for a mobile-terminated message is illustrated, according to an exemplary embodiment of the present disclosure. The illustrated message flow provides no delivery receipt to the sending entity (e.g., the SME 102). A message flow that provides a delivery receipt is illustrated and described with reference to FIG. 3.

The message flow assumes that the SME 102 has generated a message including a payload that is encoded in a first character encoding scheme. The message flow begins, at step 202, whereat the SME 102 specifies a second character encoding scheme for the payload of the message generated by the SME 102. In one embodiment, the SME 102 specifies a specific encoding scheme with deterministic results using the same client application (i.e., the SME application calling the PX API) identification rather than, as is presently done, using different client application identifications for different statically provisioned encoding schemes. It should be noted that today, different API specifications (Web Services WSDLs) and services (the server executable) would have to be used on a PX gateway to accommodate different encoding scheme to DCS translations. To use the different PX APIs, the SME would have to use different applications. The disclosed systems and methods eliminate the need to create different APIs for each transformation or mapping.

At step 204, the SME 102 sends a sendSMS PX message to the PX gateway 104. The sendSMS message includes the second encoding scheme specified by the SME 102. At step 206, the PX gateway 104 performs an encoding transformation using a mapping table stored in the PX gateway 104 to map the payload encoded in the first character encoding scheme to the second character encoding scheme as specified by the SME 102.

In one embodiment, the mapping table includes XML encoding declarations each of which is mapped to an SMPP data coding schemes. An exemplary mapping table is illustrated below.

TABLE A

| XML Encoding Scheme | DCS Value | DCS Name |
|---|---|---|
|  | 0 0 0 0 0 0 0 0 | MC Specific |
| US-ASCII/ASCII | 0 0 0 0 0 0 0 1 | IA5 (CCITT T.50)/ASCII (ANSI X3.4) |
| UTF-8 | 0 0 0 0 0 0 1 0 | Octet unspecified (8-bit binary) |

TABLE A-continued

| XML Encoding Scheme | DCS Value | DCS Name |
|---|---|---|
| ISO-8859-1 | 0 0 0 0 0 0 1 1 | Latin 1 (ISO-8859-1) |
| ISO-8859-2 | 0 0 0 0 0 0 1 1 | Latin 1 (ISO-8859-1) |
| UTF-16 | 0 0 0 0 0 1 0 0 | Octet unspecified (8-bit binary) |
| JIS (X 0208-1990) | 0 0 0 0 0 1 0 1 | JIS (X 0208-1990) |
| Cyrillic (ISO-8859-5) | 0 0 0 0 0 1 1 0 | Cyrillic (ISO-8859-5) |
| ISO-8859-8 | 0 0 0 0 0 1 1 1 | Latin/Hebrew (ISO-8859-8) |
| UCS-2 | 0 0 0 0 1 0 0 0 | UCS2 (ISO/IEC-10646) |
| ISO-10646-UCS-2 | 0 0 0 0 1 0 0 0 | UCS2 (ISO/IEC-10646) |
|  | 0 0 0 0 1 0 0 1 | Pictogram Encoding |
|  | 0 0 0 0 1 0 1 0 | ISO-2022-JP (Music Codes) |
| GB18030 | 0 0 0 0 1 0 1 1 | Reserved |
| ISO-8859-16 | 0 0 0 0 1 1 0 0 | Reserved |
|  | 0 0 0 0 1 1 0 1 | Extended Kanji JIS (X 0212-1990) |
|  | 0 0 0 0 1 1 1 0 | KS C 5601 |
| UTF-16BE | 0 0 0 0 1 1 1 1 | reserved |
|  | . . . | reserved |
| UTF-16LE | 1 0 1 1 1 1 1 1 | reserved |
|  | 1 1 0 0 x x x x | GSM MWI control |
|  | 1 1 0 1 x x x x | GSM MWI control |
| UTF-32 | 1 1 1 0 x x x x | Reserved |
|  | 1 1 1 1 x x x x | GSM message class control |

After the PX gateway 104 transforms the message payload from the first character encoding scheme to the second character encoding scheme, the PX gateway 104 generates an SMPP message including the transformed payload. The payload, in an alternative embodiment is a byte-for-byte copy of the message payload. In this embodiment, transformations are internally defined. This embodiment is most applicable to an instance wherein the mobile device would be expected to know the transformation for a specific "Reserved" DCS value.

In one embodiment, the SMPP message is a submit_sm message including text of the message payload encoded in the second character encoding scheme. In another embodiment, the SMPP message is a submit_multi message including text of the message payload encoded in the second character encoding scheme and a multimedia component. The multimedia component includes, for example, an image, a video, and/or a sound.

At step 208, the PX gateway 104 sends the submit_sm/submit_multi message to the SMSC 106. At step 210, the PX gateway 104 receives a submit_sm_resp or submit_multi_resp from the SMSC 106 in response to the submit_sm or submit_multi, respectively. At step 212, the SMSC 106 sends the message to the mobile device 108. At step 214, the PX gateway 104 sends a sendSMS_resp PX message to the SME 102. The message flow ends.

Figure 3:
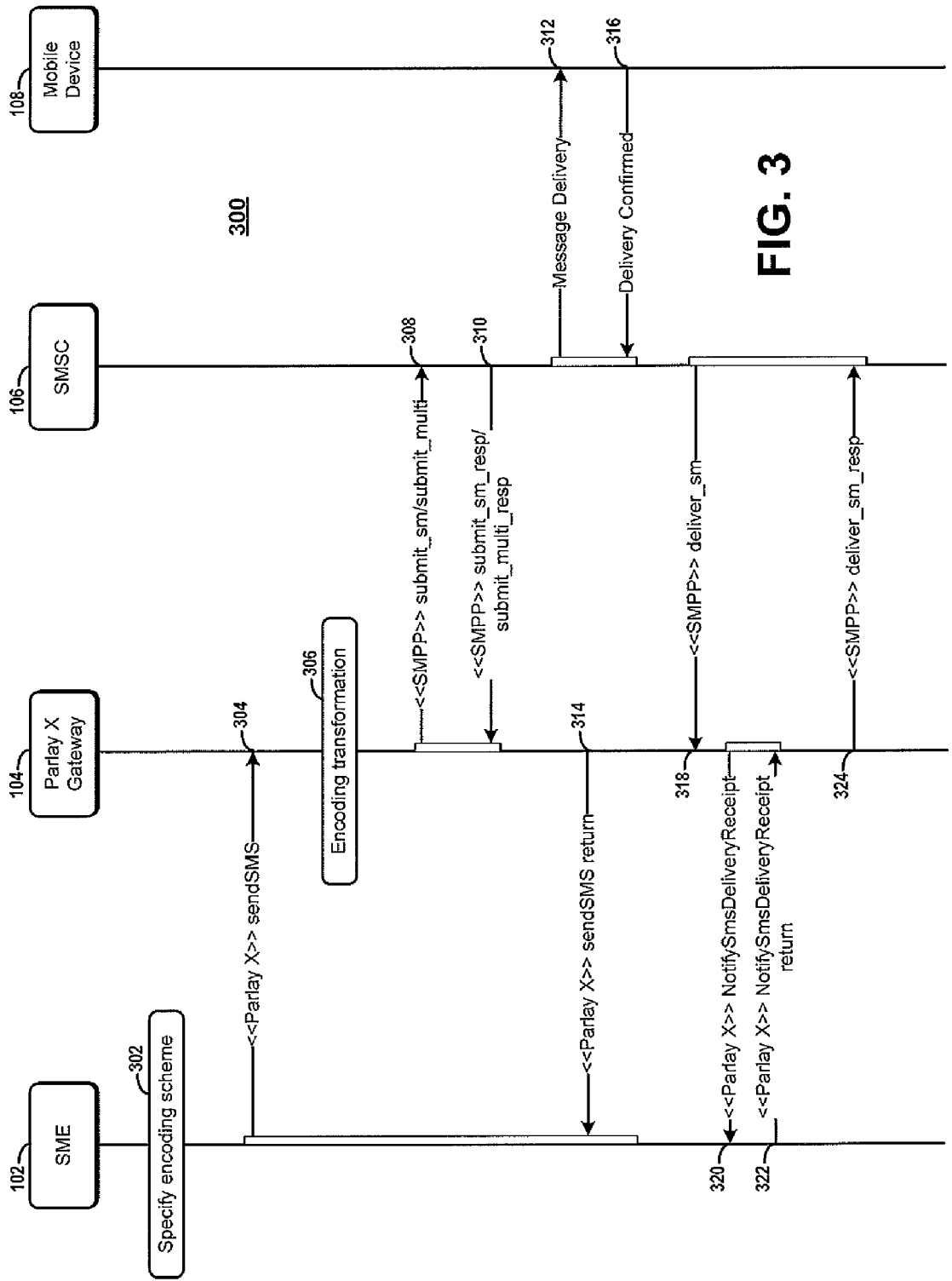
FIG. 3 schematically illustrates a message flow for a mobile-terminated message in accordance with another exemplary embodiment of the present disclosure.

Referring now to FIG. 3, a message flow diagram 300 for a mobile-terminated message is illustrated, according to another exemplary embodiment of the present disclosure. The illustrated message flow provides a delivery receipt to the sending entity (e.g., the SME 102). A message flow that does not provide a delivery receipt is illustrated and described with reference to FIG. 2.

The message flow assumes that the SME 102 has generated a message including a payload that is encoded in a first character encoding scheme. The message flow begins, at step 302, whereat the SME 102 specifies a second character encoding scheme for the payload of the message generated by the SME 102. In one embodiment, the SME 102 can specify a specific encoding scheme with deterministic results using the same client application identification rather than, as is presently done, using different client application identifications for different statically provisioned encoding schemes.

At step 304, the SME 102 sends a sendSMS PX message to the PX gateway 104. The sendSMS message includes the second encoding scheme specified by the SME 102. At step 306, the PX gateway 104 performs an encoding transformation using a mapping table stored in the PX gateway 104 to map the payload encoded in the first character encoding scheme to the second character encoding scheme as specified by the SME 102. In one embodiment, the mapping table includes XML encoding declarations each of which is mapped to an SMPP data coding schemes. An exemplary mapping table is illustrated above in TABLE A.

After the PX gateway 104 transforms the message payload from the first character encoding scheme to the second character encoding scheme, the PX gateway 104 generates an SMPP message including the transformed payload. In one embodiment, the SMPP message is a submit_sm message including text of the message payload encoded in the second character encoding scheme. In another embodiment, the SMPP message is a submit_multi message including text of the message payload encoded in the second character encoding scheme and a multimedia component. The multimedia component includes, for example, an image, a video, and/or a sound.

It should be noted that when a multimedia component is included, the PX interface is the PX multimedia API rather than the PX SMS API due to size limitations in the SMS message (i.e., 160 7-bit characters; 140 8-bit characters), although it is possible to concatenate up to five SMS messages together to form a single, long message.

At step 308, the PX gateway 104 sends the submit_sm/submit_multi message to the SMSC 106. At step 310, the PX gateway 104 receives a submit_sm_resp or submit_multi_resp from the SMSC 106 in response to the submit_sm or submit_multi, respectively. At step 312, the SMSC 106 sends the message to the mobile device 108. At step 314, the PX gateway 104 sends a sendSMS_resp PX message to the SME 102.

At step 316, the mobile device 108 responds to the message delivery with a delivery confirmation to the SMSC 106. At step 318, the SMSC 106 sends an SMPP deliver_sm message to the PX gateway 104 to notify the PX gateway 104 of successful delivery. Alternatively, the SMSC 106 may notify the PX gateway 104 of failed delivery if this is the case.

At step 320, the PX gateway 104 sends a PX NotifySmsDeliveryReceipt to the SME 106 to notify the SME 102 of successful delivery. At step 322, the SME 102 responds to the PX NotifySmsDeliveryReceipt with a PX NotifySmsDeliveryReceipt return message to confirm receipt of the delivery notification. Alternatively, the PX gateway 104 may notify the SME 102 of failed delivery if this is the case.

At step 324, the PX gateway 104 sends an SMPP deliver_sm_resp to the SMSC 106 confirm receipt of the deliver_sm message and, in the illustrated embodiment, to confirm the sending entity (i.e., the SME 102) has received the delivery confirmation. The message flow ends.

Figure 4:
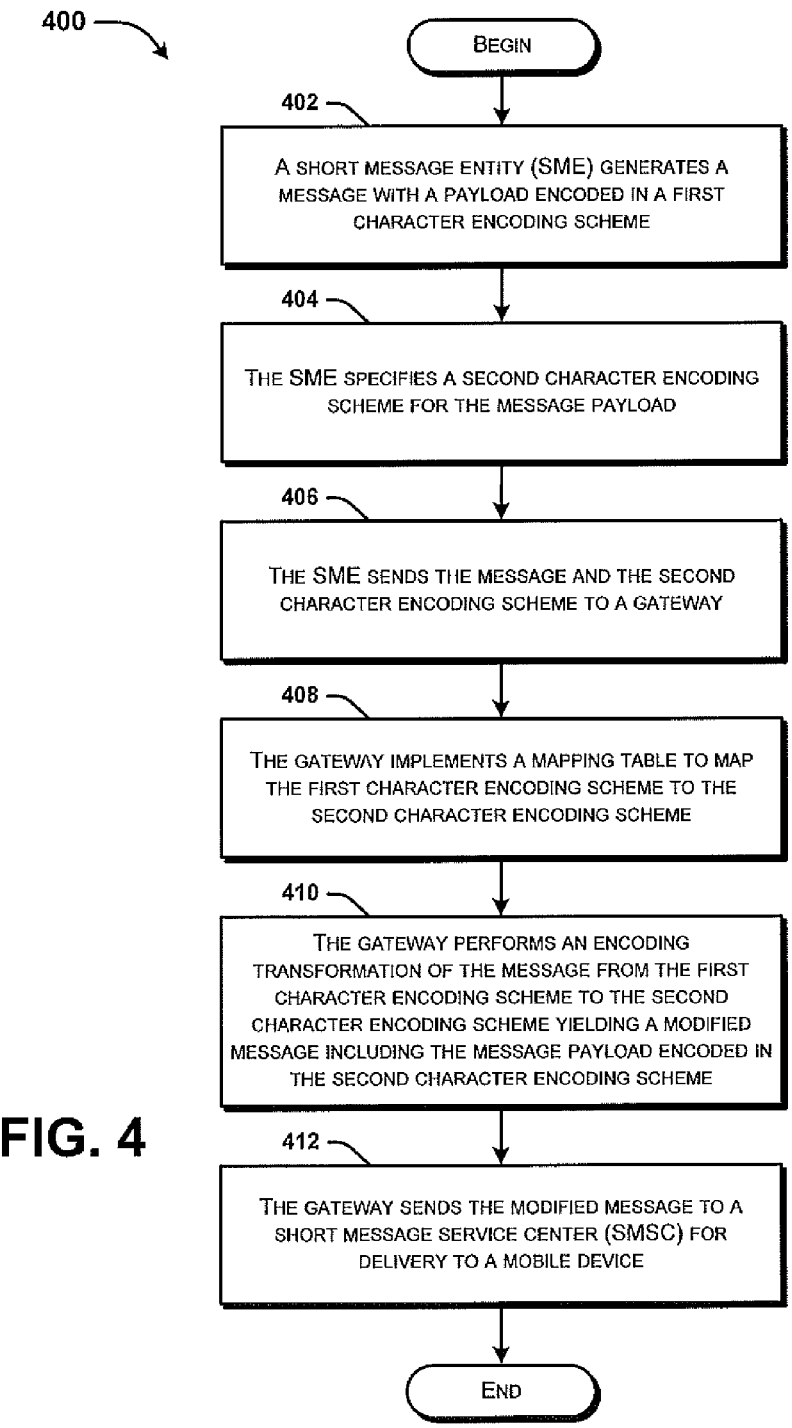
FIG. 4 illustrates a method for mapping extensible markup language (XML) message element encoding declarations to short message peer-to-peer (SMPP) data coding scheme (DCS) for mobile-terminated (MT) short messaging service (SMS) in accordance with an exemplary embodiment of the present disclosure.

Referring now to FIG. 4, a method 400 for mapping XML encoding declarations to SMPP DCS for MT SMS is illustrated, according to an exemplary embodiment of the present disclosure. It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. In certain embodiments, some or all steps of this process, and/or substantially equivalent steps can be performed by execution of computer-readable instructions stored or included on a computer-readable medium.

The method 400 begins and flow is to block 402, whereat an SME, such as the SME 102, generates a message with a payload encoded in a first character encoding scheme. At block 404, the SME specifies a second character encoding scheme for the message payload. At block 406, the SME sends the message and the second character encoding scheme to a gateway, such as the PX gateway 104.

At step 408, the gateway implements a mapping table to map the first character encoding scheme to the second character encoding scheme. At step 410, the gateway performs an encoding transformation of the message from the first character encoding scheme to the second character encoding scheme yielding a modified message including the message payload encoded in the second character encoding scheme. At block 412, the gateway sends the modified message to an SMSC, such as the SMSC 106, for delivery to a mobile device, such as the mobile device 108. The method 400 ends.

Figure 5:
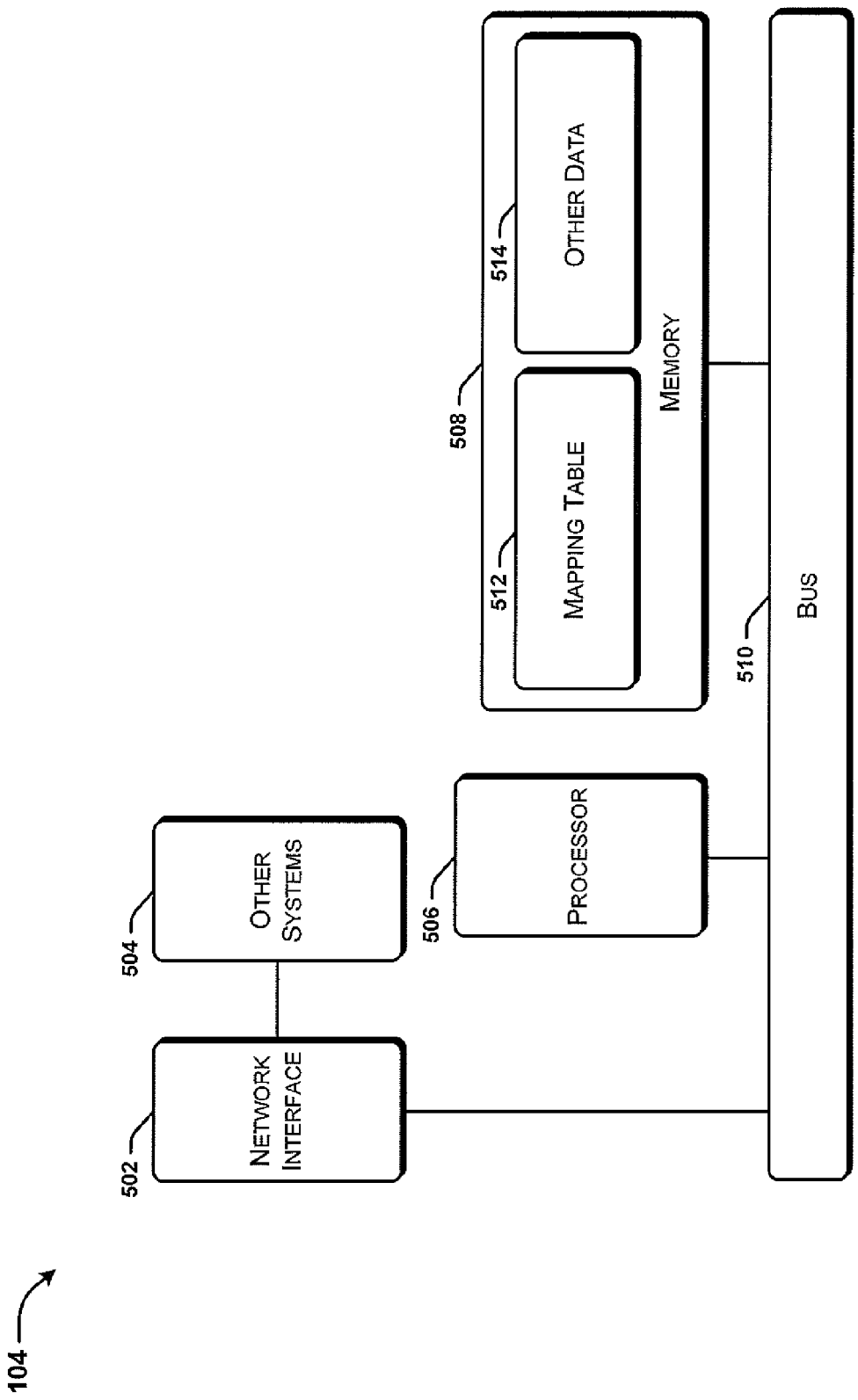
FIG. 5 schematically illustrates a Parlay-X (PX) gateway and components thereof, according to an exemplary embodiment of the present disclosure.

Referring now to FIG. 5, the PX gateway 104 and components thereof are illustrated, according to an embodiment of the present disclosure. Although connections are not shown between all components illustrated in FIG. 2, the components can interact with each other to carry out various system functions described herein. It should be understood that FIG. 2 and the following description are intended to provide a general description of a suitable environment in which the various aspects of some embodiments of the present disclosure can be implemented.

The PX gateway 104 includes a network interface 502 for facilitating communications between the PX gateway 104 and other systems 504 such as the short message entity (SME) 102, the short message service center (SMSC) 106, and other systems or components of the network architecture 100. The PX gateway 104 also includes one or more processors 506 that are in communication with one or more memory modules 508 via one or more memory/data busses 510. The memory module(s) 508 is configured to store a mapping table 512 and other data 514. The mapping table 512 includes XML encoding declaration to SMPP DCS mappings, for example, as illustrated above in Table A.

The other data 514 may include instructions that, when executed by the processor(s) 506, cause the processor(s) 506 to, among other operations, perform an encoding transformation of a message payload received from an SME (e.g., the SME 102) from a first character encoding scheme (e.g., an XML-compatible character encoding) and a second character encoding scheme (e.g., an SMPP DCS) to yield a modified message including the message payload encoded in the second character encoding scheme.

The term "memory," as used herein to describe the memory module(s) 508, collectively includes all memory types associated with the PX gateway 104 such as, but not limited to, processor registers, processor cache, random access memory (RAM), other volatile memory forms, and non-volatile, semi-permanent or permanent memory types; for example, tape-based media, tangible optical media, solid state media, hard disks, combinations thereof, and the like. While the memory module(s) 508 is illustrated as residing proximate the processor(s) 506, it should be understood that the memory module(s) 508 is in some embodiments a remotely accessible storage system. Moreover, the memory module(s) 508 is intended to encompass network memory and/or other storage devices in wired or wireless communication with the PX gateway 104.

Figure 6:
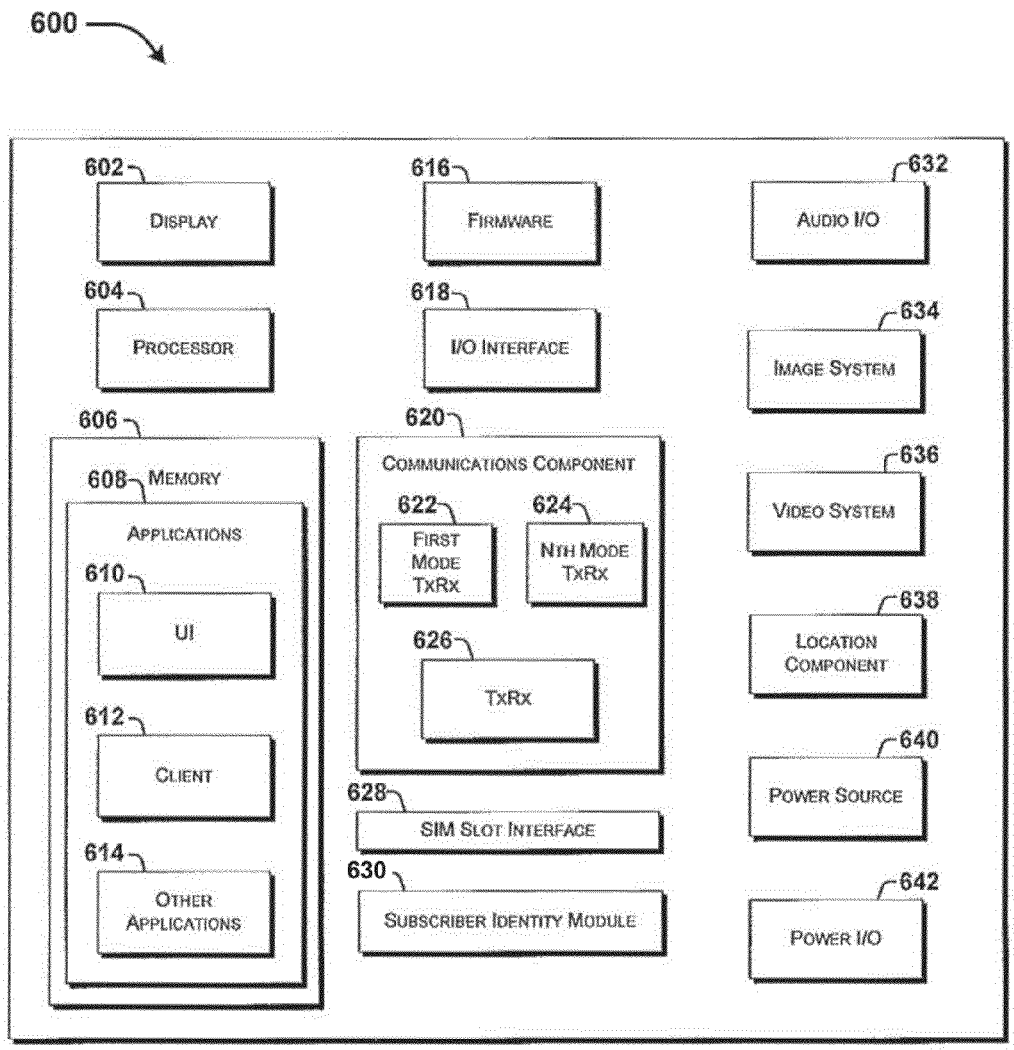
FIG. 6 schematically illustrates an exemplary mobile communications device and components thereof, according to an embodiment of the present disclosure.

Referring now to FIG. 6, a schematic block diagram of an exemplary mobile device 600 is illustrated. Although connections are not shown between the components illustrated in FIG. 6, the components can interact with each other to carry out device functions. In some embodiments, for example, the components are arranged so as to communicate via one or more busses (not shown). It should be understood that FIG. 6 and the following description are intended to provide a general understanding of a suitable environment in which various aspects of embodiments of the present disclosure can be implemented.

In some embodiments, the mobile device 108 illustrated in FIGS. 1-3 is configured like the mobile device 600 described with reference to FIG. 6. In some embodiments, the mobile device 600 is a multimode headset configured to provide access to more than one network type including, for example, the telecommunications technologies described above and/or other technologies such as Wi-Fi™ and WiMAX™.

In some embodiments, the mobile device 600 includes computer-readable media, including, for example, volatile media, non-volatile media, removable media, and non-removable media. The term "computer-readable media" and variants thereof, as used herein, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other tangible, non-transitory medium that can be used to store the desired information and that can be accessed by the mobile device 600.

As illustrated in FIG. 6, the mobile device 600 includes a display 602 for displaying multimedia such as, for example, SMS messages, multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus), music, metadata, wallpaper, graphics, Internet content, device status, preferences settings, map and location data, profile (e.g., vibrate, silent, loud) selection, and the like.

The illustrated mobile device 600 also includes a processor 604 for processing data and/or executing computer-executable instructions of one or more applications 608 stored in a memory 606. In some embodiments, the application(s) 608 include a user interface (UI) application 610. The UI application 610 interfaces with a client 612 (e.g., an operating system (OS)) to facilitate user interaction with device functionality and data. In some embodiments, the client 612 is one of Symbian OS, Microsoft® Windows® Mobile OS (available from Microsoft Corporation of Redmond, Wash.), Palm® webOS™ (available from Palm Corporation of Sunnyvale, Calif.), Palm®OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google Android™ OS (available from Google Inc. of Mountain View, Calif.). These operating systems are merely exemplary of the operating systems that may be used in accordance with the embodiments disclosed herein.

The UI application 610 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with other applications 614, and the like.

In one embodiment, the other applications 614 include an application that recognizes an incoming coding format based on the DCS. The application, in an alternative embodiment, chooses to analyze the bytes to determine the real encoding scheme to use.

In some embodiments, the other applications 614 include, for example, visual voicemail applications, messaging applications (e.g., SMS, enhanced messaging service (EMS), MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 608 are stored in the memory 606 and/or in a firmware 616, and are executed by the processor 604. The firmware 616 may also store code for execution during device power up and power down operations.

The illustrated mobile device 600 also includes an input/output (I/O) interface 618 for input/output of data, such as, for example, location information, presence status information, user IDs, passwords, and application initiation (start-up) requests. In some embodiments, the I/O interface 618 is a hardwire connection, such as, for example, a USB, mini-USB, audio jack, PS2, IEEE 1394, serial, parallel, Ethernet (RJ48) port, RJ11 port, or the like. In some embodiments, the I/O interface 618 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 618 may be used for communications between the mobile device 600 and a network device or local device, instead of, or in addition to, a communications component 620.

The communications component 620 interfaces with the processor 604 to facilitate wired/wireless communications with external systems. Example external systems include, but are not limited to, SMSCs, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks, network components, and systems described herein. In some embodiments, the external systems are implemented using Wi-Fi™, WiMAX™, combinations and/or improvements thereof, and the like. In some embodiments, the communications component 620 includes a multimode communications subsystem for providing cellular communications via different cellular technologies. In some embodiments, for example, a first cellular transceiver 622 operates in one mode, such as, GSM, and an Nth cellular transceiver 624 operates in a different mode, such as UMTS. While only two cellular transceivers 622, 624 are illustrated, it should be appreciated that a plurality of transceivers can be included.

The illustrated communications component 620 also includes an alternative communications transceiver 626 for use by other communications technologies such as, for example, Wi-Fi™, Wi-Max™, BLUETOOTH, infrared, infrared data association (IRDA), near field communications (NFC), RF, and the like. In some embodiments, the communications component 620 also facilitates reception from terrestrial radio networks, digital satellite radio networks, Internet-based radio services networks, combinations thereof, and the like.

The communications component 620 processes data from a network such as, for example, the Internet, an intranet (e.g., business intranet), a home broadband network, a Wi-Fi™ hotspot, and the like, via an Internet service provider (ISP), digital subscriber link (DSL) provider, or broadband provider. In some embodiments, the communications component 620 facilitates the transmission of authentication information from the mobile device 600 to a network for processing in accordance with the methods described herein.

The illustrated mobile device 600 also includes a SIM slot interface 628 for accommodating a SIM 630 such as, for example, a SIM card, a universal SIM (USIM) card, or a universal integrated circuit card (UICC) including one or more SIM applications (e.g., ISIM, SIM, USIM, CSIM). The SIM 630 is configured to store an international mobile subscriber identity (IMSI). The mobile device 600 can only be operated if the SIM 630 includes a valid IMSI and is inserted into the SIM slot interface 628 of the mobile device 600 with a valid IMEI.

Audio capabilities for the mobile device 600 may be provided by an audio I/O component 632 that includes a speaker for the output of audio signals and a microphone to collect audio signals.

The mobile device 600 may also include an image capture and processing system 634 (image system). Photos may be obtained via an associated image capture subsystem of the image system 634, for example, a camera. The mobile device 600 may also include a video system 636 for capturing, processing, recording, modifying, and/or transmitting video content. Photos and videos obtained using the image system 634 and the video system 636, respectively, may be added as message content to an MMS message and sent to another mobile device.

The illustrated mobile device 600 also includes a location component 638 for sending and/or receiving signals such as, for example, GPS data, assisted GPS (A-GPS) data, Wi-Fi™/Wi-Max™ and/or cellular network triangulation data, combinations thereof, and the like, for determining a location of the mobile device 600. The location component 638 may communicate with the communications component 620 to retrieve triangulation data for determining a location. In some embodiments, the location component 638 interfaces with cellular network nodes, telephone lines, satellites, location transmitters and/or beacons, wireless network transmitters and receivers, for example, Wi-Fi™ hotspots, radio transmitters, combinations thereof, and the like. Using the location component 638, the mobile device 600 obtains, generates, and/or receives data to identify its location, or transmits data used by other devices to determine the location of the mobile device 600.

The illustrated mobile device 600 also includes a power source 640, such as batteries and/or other power subsystem (AC or DC). The power source 640 may interface with an external power system or charging equipment via a power I/O component 642.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, handheld computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
receiving, by a system using a processor, from a short message entity, a first message comprising a payload encoded in accord with a first character-encoding scheme and indicating a second character-encoding scheme, wherein the first character-encoding scheme includes a parlay-x extensible markup language data coding scheme; and
transforming, by the system, the payload from the first character-encoding scheme to the second character-encoding scheme indicated in the first message received from the short message entity, wherein the second character-encoding scheme includes a short message peer-to-peer data coding scheme.

2. The method of claim 1, wherein:
the first message is of a first type;
the payload is a first payload; and
the method further comprises generating a second message being of a second type and comprising a second payload encoded according to the second character-encoding scheme.

3. The method of claim 2, wherein generating the second message comprises addressing the second message to a mobile communication device identified in the first message.

4. The method of claim 3, further comprises transmitting the second message, being of the second type and comprising the second payload encoded according to the second character-encoding scheme, to the mobile communication device identified in the first message.

5. The method of claim 1, wherein the transforming includes using a mapping table.

6. The method of claim 1, wherein the first message is a parlay-x send short messaging service message.

7. The method of claim 1, wherein the first message comprises a multimedia component, the multimedia component comprising at least one characteristic selected from a group consisting of an image, a sound, and a video.

8. A tangible computer-readable storage device comprising computer-executable instructions that, when executed by a processor, cause the processor to perform operations comprising:
receiving, from a short message entity, a first message comprising a payload encoded in accord with a first character-encoding scheme and indicating a second character-encoding scheme, wherein the first character-encoding scheme includes a parlay-x extensible markup language data coding scheme; and
transforming the payload from the first character-encoding scheme to the second character-encoding scheme indicated in the first message received from the short message entity, wherein the second character-encoding scheme includes a short message peer-to-peer data coding scheme.

9. The method of claim 4, wherein transmitting the second message, being of the second type and comprising the second payload encoded according to the short message peer-to-peer data coding scheme, to the mobile communication device identified in the first message comprises transmitting the second message, being of the second type and comprising the second payload encoded according to the short message peer-to-peer data coding scheme, to a short message service center.

10. The tangible computer-readable storage device of claim 8, wherein:
the first message is of a first type;
the payload is a first payload; and
the operations further comprise generating a second message being of a second type and comprising a second payload encoded according to the second character-encoding scheme.

11. The tangible computer-readable storage device of claim 10, wherein generating the second message comprises addressing the second message to a mobile communication device identified in the first message.

12. The tangible computer-readable storage device of claim 8, wherein the first message is a parlay-x send short messaging service message and comprises a multimedia component including at least one characteristic selected from a group consisting of an image, a sound, and a video.

13. The tangible computer-readable storage device of claim 11, wherein the operations further comprise transmitting the second message, being of the second type and comprising the second payload encoded according to the short message peer-to-peer data coding scheme, to the mobile communication device identified in the first message, and wherein transmitting the second message to the mobile communication device comprises transmitting the second message, being of the second type and comprising the second payload encoded according to the short message peer-to-peer data coding scheme, to a short message service center.

14. A system, comprising:
a processor; and
a computer-readable storage medium comprising computer-executable instructions that, when executed by the processor, cause the processor to perform operations comprising:
receiving from a short message entity, a first message comprising a payload encoded in accord with a first character-encoding scheme and indicating a second character-encoding scheme, wherein the first character-encoding scheme includes a parlay-x extensible markup language data coding scheme; and
transforming the payload from the first character-encoding scheme to the second character-encoding scheme indicated in the first message received from the short message entity, wherein the second character-encoding scheme includes a short message peer-to-peer data coding scheme.

15. The system of claim 14, wherein:
the first message is of a first type;
the payload is a first payload; and
the operations further comprise generating a second message being of a second type and comprising a second payload encoded according to the second character-encoding scheme.

16. The system of claim 15, wherein generating the second message comprises addressing the second message to a mobile communication device identified in the first message.

17. The system of claim 14, wherein the first message is a parlay-x send short messaging service message and comprises a multimedia component including at least one characteristic selected from a group consisting of an image, a sound, and a video.

18. The system of claim 16, wherein the operations further comprise transmitting the second message, being of the second type and comprising the second payload encoded according to the short message peer-to-peer data coding scheme, to the mobile communication device identified in the first message, and wherein transmitting the second message to the mobile communication device comprises transmitting the second message, being of the second type and comprising the second payload encoded according to the short message peer-to-peer data coding scheme, to a short message service center.

* * * * *